(12) United States Patent
Rueckert

(10) Patent No.: US 7,794,832 B2
(45) Date of Patent: Sep. 14, 2010

(54) SELF-RELEASING LINT TAPE

(75) Inventor: Cheryl Rueckert, Au Train, MI (US)

(73) Assignee: Neenah Paper, Inc.

( * ) Notice: Subject to any disclaimer, the term of this patent is extended or adjusted under 35 U.S.C. 154(b) by 1154 days.

(21) Appl. No.: 11/436,885

(22) Filed: May 18, 2006

(65) Prior Publication Data

US 2007/0269626 A1 Nov. 22, 2007

(51) Int. Cl.
  *B32B 7/12* (2006.01)
  *B32B 15/04* (2006.01)
  *B32B 9/00* (2006.01)
(52) U.S. Cl. .............. 428/343; 428/40.1; 428/354
(58) Field of Classification Search ............... 428/40.1, 428/343, 354
See application file for complete search history.

(56) References Cited

U.S. PATENT DOCUMENTS

| | | | |
|---|---|---|---|
| 3,055,496 A * | 9/1962 | Dunlap | 428/153 |
| 4,282,278 A | 8/1981 | Higashiguchi | |
| 4,427,726 A | 1/1984 | Wolfrum | |
| 4,698,248 A | 10/1987 | Gallagher et al. | |
| 4,713,274 A * | 12/1987 | Minor | 428/40.1 |
| 4,822,670 A | 4/1989 | Ono et al. | |
| 4,905,337 A | 3/1990 | McKay | |
| 4,977,003 A | 12/1990 | Brown et al. | |
| 5,300,291 A | 4/1994 | Sablotsky et al. | |
| 5,331,040 A | 7/1994 | Lee | |
| 5,536,571 A * | 7/1996 | Pearson et al. | 428/341 |
| 5,709,913 A | 1/1998 | Andersen et al. | |
| 5,878,457 A | 3/1999 | Cox et al. | |
| 6,014,788 A | 1/2000 | Jaffri | |
| 6,020,062 A | 2/2000 | Questel et al. | |
| 6,127,014 A | 10/2000 | McKay, Jr. | |
| 6,576,323 B2 | 6/2003 | Wise et al. | |
| 6,858,667 B1 | 2/2005 | Flerlage et al. | |
| 6,866,235 B2 | 3/2005 | Zimmermann et al. | |
| 6,887,537 B2 | 5/2005 | Bean et al. | |
| 6,901,622 B2 | 6/2005 | Thompson et al. | |
| 6,908,525 B2 | 6/2005 | Anderson et al. | |
| 6,954,963 B2 | 10/2005 | McKay | |
| 2002/0144367 A1 | 10/2002 | McKay, Jr. | |
| 2003/0096074 A1 | 5/2003 | Kim | |
| 2004/0035444 A1 | 2/2004 | Muhr-Sweeney | |

* cited by examiner

*Primary Examiner*—Victor S Chang
(74) *Attorney, Agent, or Firm*—Dority & Manning, P.A.

(57) ABSTRACT

A lint tape that contains a base sheet and an adhesive coating is generally provided. The base sheet is formed from a fibrous web that is impregnated with a binder composition, and the adhesive coating includes a pressure-sensitive adhesive and a detackifying agent. Through appropriate selection of the type and amount of the various components employed, the present inventor has discovered that the resulting lint tape is conformable to a variety of surfaces and "self-releasable", i.e., releasable without the need for an additional release coating.

23 Claims, 3 Drawing Sheets

SELF-RELEASING LINT TAPE

BACKGROUND OF THE INVENTION

Lint tape is generally packaged and sold in a stacked or rolled form. Individual lint tape sheets, for instance, may be stacked so that the adhesive layer of one sheet contacts and adheres to the back, non-adhesive layer of an adjacent sheet. In lint tape rolls, the outermost sheet has an exposed adhesive layer and a non-adhesive layer adhered to the adhesive layer of an underlying sheet. During use, the exposed adhesive layer of the outermost sheet collects lint and other loose fibers from clothing, fabrics, and other surfaces. Thereafter, this sheet may be separated from the roll to expose a fresh adhesive layer of the underlying lint tape sheet. To facilitate this separation, conventional lint tapes contain a release coating on the back surface of each sheet, opposite the adhesive layer. The release coating facilitates the removal of the lint tape sheet from the adhesive layer of the adjacent sheet. Unfortunately, however, the use of the release coating leads to increased costs and manufacturing inefficiencies.

As such, a need currently exists for an improved lint tape that functions effectively without the need for an additional release layer.

SUMMARY OF THE INVENTION

In one embodiment, a lint tape comprising a base sheet and an adhesive coating is generally disclosed. For example, the base sheet can contains a fibrous web impregnated with a binder composition. The base sheet defines a first surface and an opposing second surface. The adhesive coating is disposed on the first surface of the base sheet. The adhesive coating can comprise a pressure-sensitive adhesive and a detackifying agent in a respective weight ratio of from about 1:1 to about 20:1. The pressure-sensitive adhesive can contain a latex polymer having a glass transition temperature of less than about 10° C.

In another embodiment, a lint tape product is generally disclosed. The lint tape product can comprise a first lint tape layer and a second lint tape layer. The first lint tape layer comprises a base sheet and an adhesive coating. The base sheet comprises a fibrous web impregnated with a binder composition. The adhesive coating comprises a pressure-sensitive adhesive and a detackifying agent in a respective weight ratio of from about 1:1 to about 20:1. The pressure-sensitive adhesive comprises a latex polymer having a glass transition temperature of less than about 10° C. The second lint tape layer can also comprise a base sheet and an adhesive coating. The base sheet of the second lint tape layer comprises a fibrous web impregnated with a binder composition. The first lint tape layer and the second lint tape layer are positioned such that the adhesive coating of the first lint tape layer contacts the fibrous web of the second lint tape layer.

In yet another embodiment, a method of using the lint tape product is generally disclosed. The method comprises contacting the adhesive coating of the second lint tape layer with a surface, and removing the second lint tape layer from the lint tape product to expose the adhesive coating of the first lint tape layer.

In still another embodiment, a method of making a lint tape is generally disclosed. The method comprises forming a base sheet, saturating the base sheet, and applying an adhesive coating to a surface of the base sheet. The base sheet comprises cellulosic fibers and defines a first surface and a second surface. The base sheet is saturated with a binder composition. An adhesive coating is applied to the first surface of the base sheet. The adhesive coating comprises a pressure-sensitive adhesive and a detackifying agent in a weight ratio of from about 1:1 to about 20:1, respectively. The pressure-sensitive adhesive comprises a latex polymer having a glass transition temperature of less than about 10° C.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
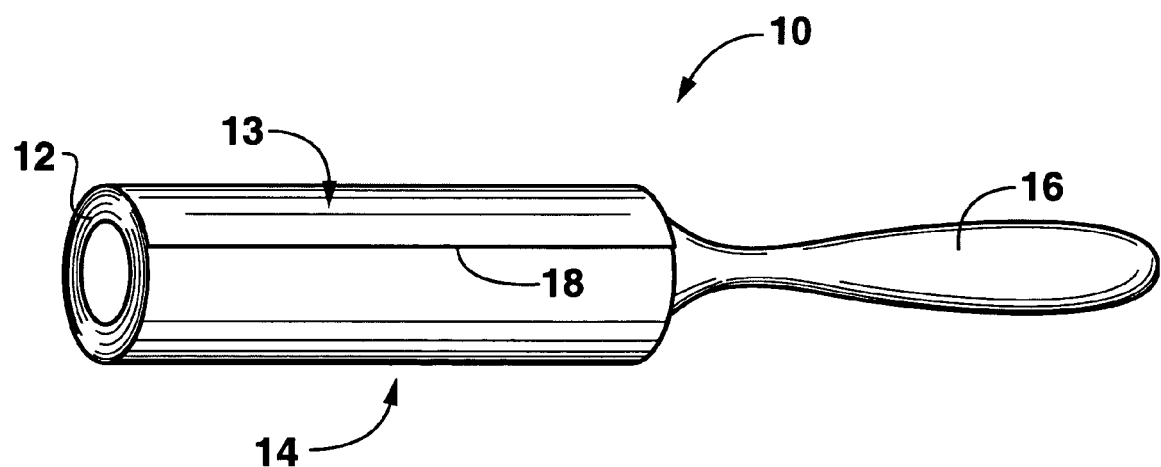
FIG. 1 is a perspective view of a lint tape roll formed according to one embodiment of the present invention.

Repeat use of reference characters in the present specification and/or drawings is intended to represent same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a lint tape that contains a base sheet and an adhesive coating. The base sheet is formed from a fibrous web that is impregnated with a binder composition, and the adhesive coating includes a pressure-sensitive adhesive and a detackifying agent. Through appropriate selection of the type and amount of the various components employed, the present inventor has discovered that the resulting lint tape is conformable to a variety of surfaces and "self-releasable", i.e., releasable without the need for an additional release coating. In this regard, various embodiments of the present invention will now be described in more detail.

I. Base Sheet

The base sheet of the lint tape may generally be formed from a variety of different materials as is well known in the art, such as nonwoven webs, paper, and so forth. In one embodiment, for example, the base sheet contains a fibrous web formed from a cellulosic fibrous material. As used herein, the term "cellulosic fibrous material" generally refers to a material that contains wood based-pulps or other non-wood derived fiber sources. The pulp may be a primary fibrous material or a secondary fibrous material ("recycled"). Sources of pulp fibers include, by way of example, woods, such as softwoods and hardwoods; straws and grasses, such as rice, esparto, wheat, rye, and sabai; canes and reeds, such as bagasse; bamboos; woody stalks, such as jute, flax, kenaf, and cannabis; bast, such as linen and ramie; leaves, such as abaca and sisal; and seeds, such as cotton and cotton liners. Softwoods and hardwoods are the more commonly used sources of cellulose fibers. Examples of softwoods include, by way of illustration only longleaf pine, shortleaf pine, loblolly pine, slash pine, Southern pipe, black spruce, white spruce, jack pine, balsam fir, douglas fir, western hemlock, redwood, and red cedar. Examples of hardwoods include, again by way of illustration only, aspen, birch, beech, oak, maple, eucalyptus, and gum. Specific examples of such pulp fibers include softwood pulps available under the trade designation LL-19 from Neenah Paper, Inc. and INTERNATIONAL PINE® from International Paper Company. Other cellulosic fibers that may be used the present invention include eucalyptus fibers, such as Primacell Eucalyptus, available from Klabin Riocell, and other hardwood pulp fibers available under the trade designations LL-16 available from Neenah Paper, Inc., St. Croix hardwood available from Georgia-Pacific Corporation, and Leaf River hardwood available from Georgia-Pacific Corporation.

The pulp fibers may generally be chemical or mechanical pulp. Chemical pulp refers to fibrous materials from which most non-cellulose components are removed by chemical pulping without substantial mechanical post-treatment. Sulfite or sulfate (Kraft) chemical processes, for example, involve the dissolution of the lignin and hemi-cellulose components from the wood to varying degrees depending on the desired application. Mechanical pulp refers to fibrous materials made of wood processed by mechanical methods. Mechanical pulp is subdivided into the purely mechanical pulps (e.g., groundwood pulp and refiner mechanical pulp) and mechanical pulps subjected to chemical pretreatment (e.g., chemimechanical pulp or chemithermomechanical pulp). Synthetic cellulose-containing fibers may also be used, such as cellulosic esters, cellulosic ethers, cellulosic nitrates, cellulosic acetates, cellulosic acetate butyrates, ethyl cellulose, regenerated celluloses (e.g., viscose, rayon, etc.).

Although not required, the cellulosic fibrous material is typically a chemical pulp. Examples of such chemical pulps include, for instance, sulfite pulps, Kraft pulps (sulfate), soda pulps (cooked with sodium hydroxide), pulps from high-pressure cooking with organic solvents, and pulps from modified processes. Sulfite and Kraft pulps differ considerably in terms of their fibrous material properties. The individual fiber strengths of sulfite pulps are usually much lower than those of Kraft pulps. The mean pore width of the swollen fibers is also greater in sulfite pulps and the density of the cell wall is lower compared to Kraft pulps, which simultaneously means that the cell-wall volume is greater in sulfite pulps. Due to their higher strength, lower pore width, and higher density, Kraft pulps are typically employed in the present invention.

While the present invention has applicability to any of the above chemical pulping processes, it is particularly useful with the Kraft process and, as such, the Kraft process is described in more detail below. Initially, suitable trees are harvested, debarked and then chipped into suitable size flakes or chips. These wood chips are sorted with the small and the large chips being removed. The remaining suitable wood chips are then charged to a digester (vessel or tank for holding the chips and an aqueous digesting composition and which can be operated in either a batch or continuous mode). In a batch type digester, wood chips and a mixture of "weak black liquor", the spent liquor from a previous digester cook, and "white liquor", a solution of sodium hydroxide and sodium sulfide, which is either fresh or from the chemical recovery plant, is pumped into the digester. In the cooking process, lignin, which binds the wood fiber together, is dissolved in the white liquor forming pulp and black liquor. The digester is sealed and heated to a suitable cook temperature (e.g. up to about 180° C.) under high pressure. After an allotted cooking time at a particular temperature and pressure (H-factor) in the digester, its contents (pulp and black liquor) are transferred to a holding tank. The pulp in the holding tank is transferred to the brown stock washers while the liquid (black liquor formed in the digester) is sent to the black liquor recovery area. The black liquor is evaporated to a high solids content, usually 60-80% solids. Once cooked, the pulp is typically subjected to a bleaching process to delignify the material. Chlorine, chlorine dioxide, sodium hypochlorite, hydrogen peroxide, oxygen, ozone, and mixtures thereof, are employed in most conventional bleaching processes. Ozone is a particularly effective bleaching technique, and may be used to perform low consistency, medium consistency, or high consistency bleaching. Ozone bleaching is normally performed an acidic pH level (less than 7) to optimize delignification effectiveness.

Once cooked and optionally bleached, the raw cellulosic fibrous material is supplied for web formation. Different cellulosic fibers may be selected to provide different attributes. The choice of fiber sources depends in part on the final application of the web. For example, softwood fibers may be included in the web to increase tensile strength. Hardwood fibers may be selected for their ability to improve formation or uniformity in distribution of the fibers. In one embodiment, the fibrous web may contain from about 30% to about 75% eucalyptus fibers based on total dry weight of the fibers, and in some embodiments, from about 50% to about 75% eucalyptus fibers based on total fiber dry weight. Likewise, the fibrous web may contain from about 25% to about 70% eucalyptus fibers based on total dry weight of the fibers, and in some embodiments, from about 25% to about 50% softwood fibers based on total fiber dry weight.

If desired, synthetic fibers may also used in conjunction with the cellulosic fibers to increase the tear resistance of the fibrous web. Examples of such synthetic fibers may include, for instance, polyolefins (e.g., polyethylene, polypropylene, polybutylene, etc.); polytetrafluoroethylene; polyesters (e.g., polyethylene terephthalate); polyvinyl acetate; polyvinyl chloride acetate; polyvinyl butyral; acrylic resins (e.g., polyacrylate, polymethylacrylate, polymethylmethacrylate, etc.); polyamides (e.g., nylon 6, nylon 6/6, nylon 4/6, nylon 11, nylon 12, nylon 6/10, and nylon 12/12); polyvinyl chloride; polyvinylidene chloride; polystyrene; polyvinyl alcohol; polyurethanes; polylactic acid; and so forth. The synthetic fibers may be monocomponent or multicomponent fibers. One example of a multicomponent fiber is comprised of two fibers having differing characteristics combined into a single fiber, commonly called a biocomponent fiber. Bicomponent fibers generally have a core and sheath structure where the core polymer has a higher melting point than the sheath polymer. Other bicomponent fiber structures, however, may be utilized. For example, bicomponent fibers may be formed with the two components residing in various side-by-side relationships as well as concentric and eccentric core and sheath configurations. One particular example of a suitable bicomponent fiber is available from KoSa under the designation CELBOND® T-255. CELBOND® T-255 is a synthetic polyester/polyethylene bicomponent fiber capable of adhering to cellulosic fibers when its outer sheath is melted at a temperature of approximately 128° C. When utilized, the synthetic fibers typically constitute from about 0.1% to about 30%, in some embodiments from about 0.1% to about 20%, and in some embodiments, from about 0.1% to about 10% of the dry weight of the web.

Particularly when natural fibers are employed, the fibrous material is generally placed in a conventional papermaking fiber stock prep beater or pulper containing a liquid, such as water. The fibrous material stock is typically kept in continued agitation such that it forms a suspension. If desired, the fibrous material may also be subjected to one or more refinement steps to provide a variety of benefits, including improvement of the bacterial filtration properties of the fibrous web. Refinement results in an increase in the amount of intimate contact of the fiber surfaces and may be performed using devices well known in the art, such as a disc refiner, a double disc refiner, a Jordan refiner, a Claflin refiner, or a Valley-type refiner. Various suitable refinement techniques are described, for example, in U.S. Pat. No. 5,573,640 to Frederick, et al., which is incorporated herein in its entirety by reference thereto for all purposes. The level of fiber degradation imparted by refinement may be characterized as "Canadian Standard Freeness" (CSF) (TAPPI Test Methods T-227 OM-94). For example, 800 CSF represents a relatively low amount of degradation, while 400 CSF represents a relatively high amount of degradation. In most embodiments of the present invention, the fibers are refined to about 400 to about 800 CSF, and in some embodiments, from about 600 CSF to about 750 CSF.

The resulting fibrous suspension may then be diluted and readied for formation into a fibrous web using conventional papermaking techniques. For example, the web may be formed by distributing the suspension onto a forming surface (e.g., wire) and then removing water from the distributed suspension to form the web. This process may involve transferring the suspension to a dump chest, machine chest, clean stock chest, low density cleaner, headbox, etc., as is well known in the art. Upon formation, the fibrous web may then be dried using any known technique, such as by using convection ovens, radiant heat, infrared radiation, forced air ovens, and heated rolls or cans. Drying may also be performed by air drying without the addition of thermal energy.

In some embodiments, the base sheet can be creped, before or after drying. Generally, conventional creping techniques reduce internal bonding within the base sheet and increase softness. Any process for creping the base sheet can be utilized in accordance with the present invention. For example, the base sheet can be creped according to a conventional wet-laid and creping process. According to this process, the base sheet is first wet-laid on a forming fabric from the pulp fibers. From the forming fabric, the formed base sheet can be transferred to a second fabric, such as a wire fabric or a felt fabric. Then, from the second fabric, the base sheet can be pressed onto the surface of a rotatable, heated dryer drum, such as a Yankee dryer, by a press roll. As such, the base sheet is lightly pressed into engagement with the surface of the dryer drum to which it adheres, due to its moisture content or due to an optional binder material that has been previously applied. As the wet web is carried through a portion of the rotational path of the dryer surface, heat is imparted to the base sheet causing most of the moisture contained within the base sheet to be evaporated. The base sheet is then removed from the dryer drum by a creping blade. The creped surface of the base sheet typically exhibits a recognizable creped pattern.

Optionally, the base sheet can be calendered. For example, following creping of the base sheet, the creped base sheet can be calendered. Calendering a base sheet can increase the softness and smoothness of the sheet. When desired, the base sheet can be calendered according to any process. Calendering generally involves pressing the base sheet in a nip formed by a first and second calendering rolls.

Various additives may be applied to the cellulosic fibrous material during formation of the fibrous web. For example, wet-strength agents may be used to improve the strength properties of the web during formation. The wet-strength agents may be present in an amount from about 0.001 wt. % to about 5 wt. %, in some embodiments from about 0.01 wt. % to about 2 wt. %, and in some embodiments, from about 0.1 wt. % to about 1 wt. %, based on the dry weight of the fibers. Wet strength agents are typically water soluble, cationic oligomeric or polymeric resins that are capable of bonding with the cellulosic fibers. For example, some suitable wet-strength agents are polyamine-epichlorohydrin, polyamide epichlorohydrin or polyamide-amine epichlorohydrin resins (collectively "PAE" resins). Examples of these materials are described in U.S. Pat. Nos. 3,700,623 to Keim and 3,772,076 to Keim, which are incorporated herein in their entirety by reference thereto for all purposes. Suitable PAE resins are available from Hercules, Inc. of Wilmington, Del. under the designation "KYMENE®" (e.g., KYMENE® 557H or 557 LX). KYMENE® 557 LX, for example, is a polyamide epicholorohydrin polymer that contains both cationic sites, which may form ionic bonds with anionic groups on the pulp fibers, and azetidinium groups, which may form covalent bonds with carboxyl groups on the pulp fibers and crosslink with the polymer backbone when cured. Other suitable polyamide-epichlorohydrin resins are described in U.S. Pat. Nos. 3,885,158 to Petrovich; 3,899,388 to Petrovich; 4,129,528 to Petrovich; 4,147,586 to Petrovich; and 4,222,921 to van Eanam, which are incorporated herein in their entirety by reference thereto for all purposes.

Of course, other wet strength agents may also be employed in certain embodiments of the present invention. For example, other suitable wet strength agents may include dialdehyde starch, polyethylene imine, mannogalactan gum, glyoxal, and dialdehyde mannogalactan. Particularly useful wet-strength agents are water-soluble polyacrylamide resins available from Cytec Industries, Inc. of West Patterson, N.J. under the designation PAREZ® (e.g., PAREZ® 631NC). The PAREZ® resins are formed from a polyacrylamide-glyoxal polymer that contains cationic hemiacetal sites. These sites may form ionic bonds with carboxyl or hydroxyl groups present on the cellulosic fibers to provide increased strength to the web. Because the hemiacetal groups are readily hydrolyzed, the wet strength provided by the resins is primarily temporary. Such resins are believed to be described in U.S. Pat. Nos. 3,556,932 to Coscia, et al. and 3,556,933 to Williams, et al., which are incorporated herein in their entirety by reference thereto for all purposes.

In accordance with the present invention, a binder composition is also applied to the fibers, before and/or after web formation, to further improve the strength properties of the fibrous web. Typically, the binder composition includes a latex polymer, such as polyacrylates, including polymethacrylates, poly(acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers. Specific examples of suitable latex polymers include polyacrylate binders available under the designations HYCAR® 26469, 26552, and 26703 from Noveon, Inc. of Cleveland, Ohio. Another suitable latex polymer is an acrylic latex available from Rohm & Haas of Philadelphia, Pa. under the designation "B20." The latex polymer may be self-crosslinking. Alternatively, a crosslinking agent may be employed, such as an aziridine oligomer having at least two aziridine functional groups, such as XAMA®-7 (Noveon, Inc. of Cleveland, Ohio) and Chemitite PZ-33 (Nippon Shokubai Co. of Osaka, Japan).

The binder composition may be applied to the cellulosic fibrous material before, during, and/or after web formation using any technique known in the art. Preferably, the binder composition is saturated into the fibrous web after it is formed. Any known saturation technique may be employed, such as brushing, flooded nip saturation, doctor blading, spraying, and direct and offset gravure coating. For example, the web may be exposed to an excess of the solution and then squeezed. The squeezing of excess binder from the web may be accomplished by passing the web between rollers. If desired, the excess binder may be returned to the supply for further use. After squeezing out excess material, the saturated web may then be dried. Other suitable techniques for impregnating a web with a binder composition are described in U.S. Pat. No. 5,595,828 to Weber and U.S. Patent Application Publication No. 2002/0168508 to Reed, et al., which are incorporated herein in their entirety by reference thereto for all purposes. The amount of the binder composition applied may vary depending on the desired properties of the web, such as the desired permeability. Typically, the binder composition is present at an add-on level of from about 10% to about 90%, in some embodiments from about 20% to about 70%, and in some embodiments, from about 30% to about 60%. The add-on level is calculated, on a dry weight basis, by dividing the dry weight of binder composition applied by the dry weight of the web before treatment, and multiplying the result by 100.

In addition to the ingredients set forth above, various other additives may also be employed in the fibrous web. The additives may be applied directly the web or fibers, in conjunction with the binder composition or adhesive coating, or as a separate coating. By way of example, suitable additives may include antifoaming agents, pigments, processing aids, and dispersing agents. Examples of antifoaming agents include, but are not limited to, products such as NALCO® 7518 available from Nalco Chemical Company or DOW Corning® Antifoam available from Dow Corning Corporation. Dispersing agents or surfactants include, but are not limited to, products such as TAMOL® 731A available from Rohm & Haas Co., PLURONIC® F108 available from BASF Corporation, SMA® 1440 Resin available from ATOFINA Chemicals, Inc., and TERGITOL® 15S available from Union Carbide Corp. Examples of processing aids may include, but are not limited to, products such as NOPCOTE® DC-100A available from Geo Specialty Chemicals, Inc., SCRIPSET® 540 available from Solutia, Inc. and AQUAPEL® 752 available from Hercules Incorporated. Examples of pigments used to increase opacity include but are not limited to, titanium dioxide such as TI-PURE® Rutile Titanium Dioxide available from E.I. Du Pont De Nemours & Co. and kaolin pigments, which are available from a variety of manufacturers. A wide range of pigments and dyes may also be added to impart color to the saturated sheet. The foregoing list of categories of additives and examples of categories is provided by way of example and is not intended to be exhaustive.

The basis weight of the base sheet can be any basis weight useful for providing a lint tape sheet, such as from about 10 gsm to about 200 gsm or greater. For example, in some embodiments, the base sheet can have a basis weight of from about 20 gsm to about 85 gsm, such as from about 25 gsm to about 65 gsm. Also, the base sheet can have any thickness useful for providing a lint tape sheet, such as up to about 0.5 millimeters. For example, the base sheet can have a thickness of from about 0.05 millimeters to about 0.4 millimeters, such as from about 0.1 millimeters to about 0.3 millimeters.

II. Adhesive Coating

The adhesive coating of the present invention contains a pressure-sensitive adhesive and a detackifying agent. The pressure-sensitive adhesive is used to pick-up lint, fibers, etc. from a surface, and the detackifying agent is used to control the amount of tack exhibited by the pressure-sensitive adhesive while still allowing the release of the adhesive from an adjacent base sheet. In accordance with the present invention, the relative amounts of the adhesive and detackifying agent may be selectively controlled to provide a balance between tack and releasability.

By varying the relative amounts of adhesive and detackifying agent, the tack and releasibility of the adhesive coating can be controlled. The present inventors have found that the tack of the adhesive coating decreases as the amount of detackifying agent increases. However, the present inventors have unexpectedly discovered that the releasibility of the adhesive coating actually decreases as the amount of detackifying agent increases. In other words, the more detackifying agent present in the adhesive coating, the amount of force required to peel two layers of base sheet actually increases. Thus, by controlling the amount of detackifying agent present in the adhesive coating, the present inventors have discovered that an adhesive coating can be provided with the desired balance of tack and releasibility.

That is, if the amount of the adhesive is too great, the lint tape will function effectively in capturing lint but may not possess the desired capacity to separate from an adjacent tape. Likewise, if the amount of the adhesive is too low, the lint tape will readily separate from an adjacent tape, but may not possess adequate lint reduction properties. Thus, the weight ratio of the adhesive to the detackifying agent is typically from about 1:1 to about 20:1, in some embodiments from about 2:1 to about 15:1, and in some embodiments, from about 4:1 to about 10:1. For example, the adhesive may constitute from about 50 wt. % to about 99 wt. %, in some embodiments from about 60 wt. % to about 95 wt. %, and in some embodiments, from about 70 wt. % to about 90 wt. % of the coating. Likewise, the detackifying agent may constitute from about 1 wt. % to about 50 wt. %, in some embodiments from about 5 wt % to about 40 wt. %, and in some embodiments, from about 10 wt. % to about 30 wt. % of the coating.

A. Pressure-Sensitive Adhesive

The pressure-sensitive adhesive of the present invention is generally tacky at room temperature (e.g., about 20° C. to about 25° C.) and may be adhered to a surface by the application of light pressure. Suitable pressure-sensitive adhesives may include a latex polymer, such as polyacrylates, including polymethacrylates, poly(acrylic acid), poly(methacrylic acid), and copolymers of the various acrylate and methacrylate esters and the free acids; styrene-butadiene copolymers; ethylene-vinyl acetate copolymers; nitrile rubbers or acrylonitrile-butadiene copolymers; poly(vinyl chloride); poly(vinyl acetate); ethylene-acrylate copolymers; vinyl acetate-acrylate copolymers; neoprene rubbers or trans-1,4-polychloroprenes; cis-1,4-polyisoprenes; butadiene rubbers or cis- and trans-1,4-polybutadienes; and ethylene-propylene copolymers.

To optimize the conformability and flexibility of the lint tape to a variety of different surfaces, a latex polymer may be selected that has a relatively low glass transition temperature. The latex polymer may, for example, have a glass transition temperature of less than about 10° C., in some embodiments less than about 0° C., and in some embodiments, less than about −20° C. Particularly suitable latex polymers are acrylate latex polymers (e.g., homopolymers and heteropolymers of acrylate esters and methacrylate esters) having the desired glass transition temperature. Suitable acrylate latex polymers may include those available from Noveon, Inc. of Cleveland, Ohio under the designation HYSTRETCH®, such as HYSTRETCH® V-29, HYSTRETCH® V43, and HYSTRETCH® V-60. The "V-29", "V-43", and "V-60" latex polymers have a glass transition temperature of −29° C., −43° C., and −60° C., respectively.

B. Detackifying Agent

Any of a variety of detackifying agents may be incorporated into the adhesive coating of the present invention. The detackifying agent may, for example, be a particulate material that does not possess significant tack at room temperature. Suitable particles may include, for instance, silica or silicates, clays, borates, and the like.

In one particular embodiment, the detackifying agent is a natural or synthetic clay. Clays may include, without limitation, kaolin minerals (including kaolinite, dickite and nacrite), talc, serpentine minerals, mica minerals (including illite), chlorite minerals, sepiolite, palygorskite, bauxite, etc. Another suitable clay is a smectite type clay. Examples of suitable smectites are, without limitation, montmorillonite (sometimes referred to as bentonite), beidellite, nontronite, hectorite, saponite, sauconite and laponite. Bentonite is an example of a naturally occurring combination of clay particles that are rich in montmorillonite and may also contain other smectites and non-clay mineral constituents. Consequently, montmorillonites or their mixtures with other smectites are often referred to simply as bentonite. Bentonite clays are fine crystals or particles, usually plate-like in shape, with a lateral dimension up to 2 µm and a thickness in a range of a few to tens of nanometers (nm).

The detackifying agent may also contain a silica or silicate material. The terms silica and silicate containing materials are used interchangeable herein. Examples of such silica containing materials comprise at least one member chosen from the group of silica, boro-silicates, silicates such as magnesium silicate, calcium silicate, potassium silicate, lithium silicate, sodium silicate and magnesium silicate; tetra-ethyl, tetramethyl orthosilicate, silicones, kaolin, Al—Na ($SiO_2$) complex oxides, sodium aluminate, silanes, partially hydrolyzed ethyl ortho silicate and its reaction products formed with quaternary ammonium compounds (e.g., cetyltrimethyl ammonium bromide in ethyl alcohol), iron silicate, tetra alkyl ammonium salts of silica acids, precursors thereof, among others. Silicate containing materials also include TEOS, TMOS, among others.

Other suitable detackifying agents include borate-containing materials or precursors thereof. Examples of such borate-containing materials comprise at least one member chosen from the group of boric acid, boro-silicates, metaboric acid, boron oxide, ammonium tetraborate, ammonium pentaborate, ammonium peroxyborate, beryllium ortho borate, orthoboric acid, tetraboric acid, boron phosphide, boron selenide, boron trisilicide, boron hexasilicide, boron trisulfide, boron pentasulfide, lead borate, zinc borate, magnesium borate, cesium borate, rubidium borate, precursors thereof, among others. Borate-containing materials can further comprise at least member chosen from the group of aluminum oxide, zirconium silicate, magnesium silicate, kaolin, potassium silicate, sodium silicate, calcium silicate, sodium aluminate, bentonite, among others.

Of course, in addition the components identified above, the adhesive coating may also include other additives for providing the coating with desirable qualities. Examples include, but are not limited to, crosslinking agents, chemicals for pH adjustment, and surfactants.

The adhesive coating of the present invention may generally be applied to the base sheet using any technique known in the art. For instance, the components of the coating may be initially dissolved or dispersed in a solvent to form a coating formulation that may be easily applied to the base sheet. Any solvent capable of dispersing or dissolving the components is suitable, for example water; alcohols such as ethanol or methanol; dimethylformamide; dimethyl sulfoxide; hydrocarbons such as pentane, butane, heptane, hexane, toluene and xylene; ethers such as diethyl ether and tetrahydrofuran; ketones and aldehydes such as acetone and methyl ethyl ketone; acids such as acetic acid and formic acid; and halogenated solvents such as dichloromethane and carbon tetrachloride; as well as mixtures thereof. In one particular embodiment, for example, water is used as the solvent so that an aqueous coating formulation is formed. Although the actual concentration of solvent (e.g., water) employed may vary, it is nonetheless typically present in an amount from about 10 wt. % to about 80 wt. %, in some embodiments from about 20 wt. % to about 70 wt. %, and in some embodiments, from about 25 wt. % to about 60 wt. % of the coating formulation. The amount of the adhesive, detackifying agent, and other components added to the coating formulation may vary depending on the wet pick-up of the application method utilized and target add-on level.

The coating formulation may be applied to the base sheet using any conventional application technique, such as bar, roll, knife, curtain, print (e.g., rotogravure), spray, slot-die, drop-coating, or dip-coating techniques. The coating may be applied to one or both surfaces of the substrate. For example, the adhesive coating may be present on only one surface of the base sheet. The adhesive coating may cover an entire surface of the base sheet. Alternatively, to enhance the conformability and releasability of the tape, it may sometimes be desired to apply the adhesive coating so as to cover less than 100%, in some embodiments from about 10% to about 80%, and in some embodiments, from about 20% to about 60% of the area of one or more surfaces of the substrate. For example, in some embodiments, the adhesive coating can be applied to the entire surface of the base sheet, except leaving a small portion of one edge of the surface uncoated. In this manner, the coated base sheets may be more easily peeled from each other because the non-adhered edge provides a tab-like portion of the sheet to aid separation of two adjacent sheets. Although not required, such a patterned adhesive coating may provide sufficient lint-pick up without covering a substantial portion of the surface area of the base sheet. In addition, when applying the adhesive coating to multiple surfaces, each surface may be coated sequentially or simultaneously.

Regardless of the manner in which the coating is applied, the resulting coated base sheet is typically dried at a certain temperature to remove the solvent from the coating. For example, the coated sheet may be heated to a temperature of at least about 100° C., in some embodiments at least about 150° C., and in some embodiments, at least about 200° C. Suitable drying techniques may include heating with, for instance, a convection oven, microwave, forced air oven, heated roll or can, and so forth.

The add-on level of the adhesive coating (after drying) may vary as desired. The "add-on level" is determined by subtracting the weight of the uncoated base sheet from the weight of the coated base sheet (after drying), dividing this calculated weight by the weight of the uncoated base sheet, and then multiplying by 100%. Lower add-on levels may optimize certain properties (e.g., flexibility), while higher add-on levels may optimize lint pick-up. In some embodiments, for example, the add-on level is from about 20% to about 150%, in some embodiments from about 40% to about 100%, and in some embodiments, from about 60% to about 80%. The thickness of the adhesive coating may also vary. For example, the thickness may range from about 0.01 millimeters to about 5 millimeters, in some embodiments, from about 0.01 millimeters to about 3 millimeters, and in some embodiments, from about 0.1 millimeters to about 2 millimeters. In some cases, a relatively thin coating may be employed (e.g., from about 0.01 millimeters to about 0.5 millimeters). Such a thin coating may enhance the flexibility of the substrate, while still providing good lint pick-up.

In one particular embodiment, the adhesive coating can be applied to a creped base sheet. Creping generally causes the creped surface of the base sheet to take on a conventional crepe structure having a recognizable crepe pattern. For instance, the crepe pattern can include an undulatory pattern including crepe peaks or folds on the surface of the base sheet. Even when creped only on one surface, the crepe pattern is generally visible on both sides of the web, though it can be more clearly discerned on the side of the web, which contacted the creping blade. The frequency and height of the crepe peaks forming the creping pattern can vary depending on various factors including, for example, line speed and web tension. Due to the nature of the creping pattern, the adhesive coating is preferably applied to the uncreped side (i.e. the side that does not contact the creping blade, sometimes referred to as the felt side) of the base sheet, opposite the creped side. As explained above, the felt side generally has a more uniform and flat surface when compared to the opposing, creped surface having a creping pattern including creping peaks and valleys. Because of the peaks (and resulting valleys) in the creping pattern, application of the adhesive coating to the creped side of the base sheet can require more adhesive to fill in the valleys than if applied to the non-creped felt side.

As a result of the present invention, a lint tape is formed that contains a releasable adhesive coating. The presence of the detackifying agent allows the adhesive-coated base sheets to be stacked without the need for any additional release layer on the base sheets. In fact, the lint tape of the present invention may be formed from only two layers, i.e., the base sheet and the adhesive coating. For example, the releasable adhesive coating may be positioned adjacent to the base sheet of another tape and readily separated therefrom. The ability of the lint tape of the present invention to "release" in this manner may be characterized in terms of the force required to separate one tape from another tape (i.e., "peel strength"). The peel strength may be determined when holding the layers at facing edges and pulling the layers in opposite directions. This is commonly referred to as a "T-peel" because peeling results in the two separated portions of the tapes forming the arms of the letter "T" with the base of the letter "T" being the portion of the two tapes that remain attached until pulled apart. Peel strength may be determined in accordance with ASTM F904-98. The peel strength between two tapes formed according to the present invention may, for instance, range from about 5 to about 100 g/in, in some embodiments from about 10 to about 60 g/in, and in some embodiments, from about 20 to about 40 g/in.

Figure 2:
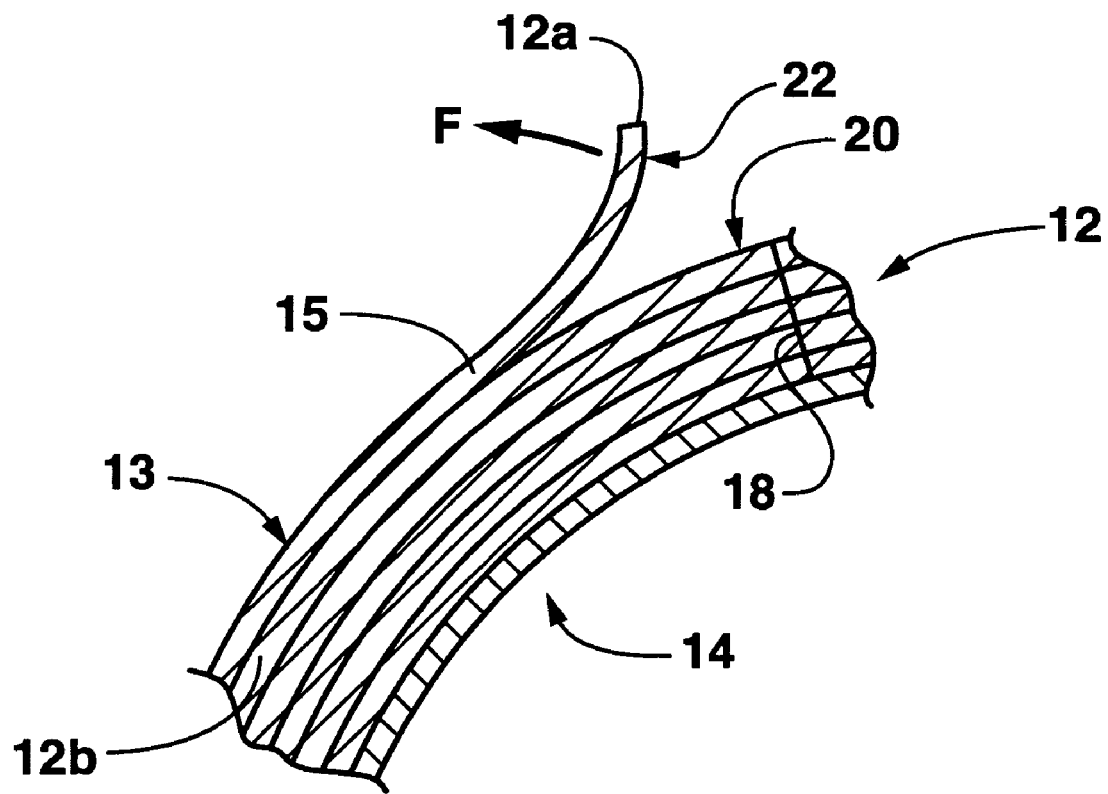
FIG. 2 is a blown-up, cut-away view of the lint tape roll of FIG. 1.

The lint tape of the present invention may be used alone or incorporated into any of a variety of different lint removal products (e.g., roll, stack, etc.). Lint removal products typically include more than one layer of lint tape with the outermost lint tape layer having its adhesive coating exposed. Referring to FIGS. 1-2, for example, one embodiment of a lint removal product 10 that may be used in the present invention is shown. In this embodiment, the product 10 contains a plurality of lint tape layers 12 provided on roll 14, with an outer lint tape layer 12a containing an adhesive coating 13 and base sheet 15. The product 10 also includes a handle 16 for gripping by a user. When desired, the outermost lint tape layer 12a may simply be peeled from the product 10 to expose a new, unused self-releasing adhesive coating 20 of lint tape layer 12b. Peeling may start at a seam 18 and proceed in a direction "F" until a back surface 22 of the base sheet 15 releases from the adjacent lint tape layer 12b.

As shown, roll 14 contains a plurality of lint tape layers 12, in which each layer is a separate and individual lint tape layer 12 having edges at seam 18. However, in alternative embodiments (not shown), roll 14 can contain a single coated base sheet wound around roll 14 to form at least two lint tape layers. In this embodiment, the user can peel away a desired length of the wound base sheet and separate it from the roll 14 by tearing or cutting to expose a new, unused layer. In one embodiment, the base sheet can have perforations spaced apart throughout the base sheet to facilitate separation.

Figure 3:
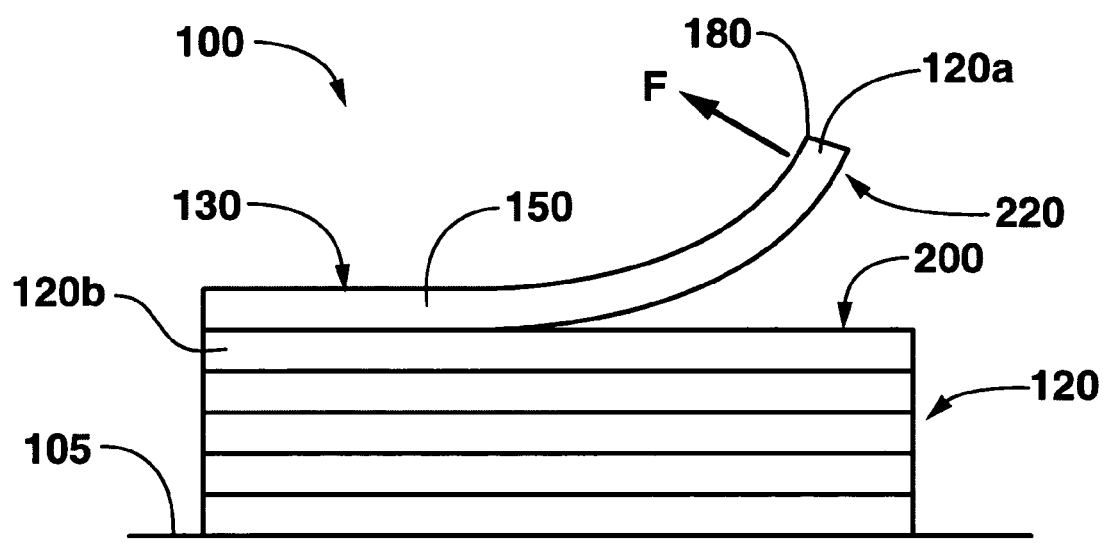
FIG. 3 is a perspective view of a lint tape stack formed according to another embodiment of the present invention.

In an alternative embodiment, the lint tapes of the present invention can be incorporated into a stacked product. Referring to FIG. 3, for example, one embodiment of a stacked lint removal product 100 that may be used in the present invention is shown. In this embodiment, the product 100 contains a plurality lint tape layers 120, with an outer lint tape layer 120a containing an adhesive coating 130 and base sheet 150. When desired, the outer lint tape layer 120a may simply be peeled from the stacked product 100 to expose a new, unused self-releasing adhesive coating 200 of lint tape layer 120b. Peeling may start at an edge 180 and proceed in a direction "F" until a back surface 220 of the base sheet 150 releases from the adhesive coating 200 of the adjacent lint tape layer 120b.

As shown, the outer lint tape layer 120a is arranged on the stacked product 100 with the adhesive coating 130 exposed. However, in an alternative embodiment, the stacked lint tape product can be provided such the adhesive layers are oppositely arranged (i.e., the adhesive side faces the product base 105 instead of being exposed). In this embodiment, the user peels the outer lint tape layer from the stack and uses it as an individual lint tape. After use, the individual lint tape can then be thrown away.

The present invention may be better understood with reference to the following example.

EXAMPLES

The ability to form a lint tape in accordance with the present invention was demonstrated. The base sheet was formed from a blend of pulp fibers containing 55.6 wt. % LL-19 and 44.4 wt. % LL-16, both of which are commercially available from Neenah Paper, Inc. Kymene® 557LX (Hercules, Inc.) was also added to the pulp furnish in a conventional amount for wet strength. LL-19 is a bleached Northern softwood pulp and LL-16 is a bleached Northern hardwood pulp. The basis weight of the base sheet was 147 grams per square meter and the thickness was about 0.33 millimeters (about 13 mils). The web was also saturated with a binder composition that contained 95 wt. % acrylic latex (available as B20 sold by Rohm & Haas). The solids add-on level of the binder was 50%. The web was then calendered.

Each of the following adhesive coatings were applied to the wire-side of the fibrous web by a meyer rod coating technique and oven dried at 105° C. for about 1 minute. The adhesive coatings each contained a blend of an acrylic latex available under the name HYSTRETCH® V-29 from Noveon, Inc. and a kaolin clay available under the trade name UltraWhite-90 from Engelhard Corp. of Iselin, N.J. The add-on level of each coating was 15 gsm (i.e., about 4 pounds per 1300 sq. feet).

Adhesive Coating A

The adhesive coating blend of A comprised 66 parts acrylic latex (V-29) and 12 parts kaolin clay (UW-90).

Adhesive Coating B

The adhesive coating blend of B comprised 16.5 parts acrylic latex (V-29) and 12 parts kaolin clay (UW-90). In other words, the relative amount of clay to adhesive was increased by 4 times the relative amount of adhesive coating A.

Adhesive Coating C

The adhesive coating blend of C comprised 8× kaolin clay (UW-90) than blend A. The adhesive coating blend of C comprised 8.3 parts acrylic latex (V-29) and 12 parts kaolin clay (UW-90). In other words, the relative amount of clay to adhesive was increased by 8 times the relative amount of adhesive coating A.

Results

The coated, saturated paper sheets were tested in a T-peel force test. To test the peel strength, a 5×6 inch stack of sheets described above was arranged such that the adhesive coating of one sheet contacted the back (non-coated) surface of the adjacent sheet. The stack was pressed overnight by a force of 1500 lbs. The pressed samples were then cut to a width of 1.5 inches and the T-peel was started from one end. The ends were inserted into the jaws of a Thwing-Albert tensile tester and the grams-force required to pull the paper sheets apart was measured. The cross-head speed was 12 inches per minute.

Each adhesive coating was applied to the base sheet and three samples were tested for each. The results are shown in Table 1:

|  | Adhesive Coating A Peel Strength (g per 1.5 inch) | Adhesive Coating B Peel Strength (g per 1.5 inch) | Adhesive Coating C Peel Strength (g per 1.5 inch) |
| --- | --- | --- | --- |
| Sample 1 | 33 | 139 | 297 |
| Sample 2 | 37 | 124 | 220 |
| Sample 3 | 36 | 106 | 151 |
| Average of Samples 1-3 | 35 | 123 | 223 |

For adhesive coating A, the average test result was 35 grams per 1.5 inches (23.3 g/in). These results indicate that the coated, saturated paper sheet can self-release from the back (uncoated) surface of another saturated paper sheet. Also, the adhesive coating of the coated, saturated paper sheet exhibited a strong affinity for adhering to lint and other loose fibers.

For adhesive coating B, the average test result was 123 grams per 1.5 inches (82 g/in). For adhesive coating C, the average test result was 223 grams per 1.5 inches (149 g/in). Thus, these results show that as the ratio of the amount of clay to the amount of adhesive increases, so does the force required to peel the base sheets apart. Also, as the ratio of the amount of clay to the amount of adhesive increases, the amount of tack of the adhesive coating decreases.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A lint tape consisting of:
    a base sheet containing a fibrous web impregnated with a binder composition, the base sheet defining a first surface and an opposing second surface, wherein said opposing second surface of said base sheet has no release layer present thereon; and
    an adhesive coating disposed on said first surface of said base sheet, wherein said adhesive coating comprises a pressure-sensitive adhesive and a detackifying agent in a respective weight ratio of from about 1:1 to about 20:1, wherein said pressure-sensitive adhesive contains a latex polymer having a glass transition temperature of less than about 10° C.

2. A lint tape as in claim 1, wherein said latex polymer has a glass transition temperature of less than about 0° C.

3. A lint tape as in claim 1, wherein said latex polymer has a glass transition temperature of less than about −20° C.

4. A lint tape as in claim 1, wherein said detackifying agent comprises a clay.

5. A lint tape as in claim 4, wherein said detackifying agent comprises a kaolin clay.

6. A lint tape as in claim 1, wherein said latex polymer comprises an acrylic latex.

7. A lint tape as in claim 1, wherein said binder composition comprises an acrylic latex.

8. A lint tape as in claim 1, wherein said opposing second surface of said base sheet defines a creping pattern.

9. A lint tape as in claim 1, wherein said fibrous web comprises cellulosic fibers.

10. A lint tape product comprising
    a first lint tape layer comprising a base sheet and an adhesive coating, wherein said base sheet comprises a fibrous web impregnated with a binder composition, wherein said adhesive coating comprises a pressure-sensitive adhesive and a detackifying agent in a respective weight ratio of from about 1:1 to about 20:1, said pressure-sensitive adhesive comprising a latex polymer having a glass transition temperature of less than about 10° C.;
    a second lint tape layer comprising a base sheet and an adhesive coating, wherein said base sheet comprises a fibrous web impregnated with a binder composition;
    wherein said first lint tape layer and said second lint tape layer are positioned such that said adhesive coating of said first lint tape layer directly contacts said fibrous web of said second lint tape layer without any release layer on the second lint tape layer.

11. A lint tape product as in claim 10, wherein said first lint tape layer and said second lint tape layer are wound on a roll such said adhesive coating of said second lint tape layer is exposed.

12. A lint tape product as in claim 11, wherein said first lint tape layer and said second lint tape layer comprise individual fibrous webs.

13. A lint tape product as in claim 11, wherein said first lint tape layer and said second lint tape layer comprise a continuous paper web wound around a roll.

14. A lint tape product as in claim 10, wherein said first lint tape layer and said second lint tape layer are stacked.

15. A lint tape product as in claim 10, wherein said adhesive coating of said second lint tape layer comprises a pressure-sensitive adhesive and a detackifying agent in a respective weight ratio of from about 1:1 to about 20:1, said pressure-sensitive adhesive comprising a latex polymer having a glass transition temperature of less than about 10° C.

16. A lint tape product as in claim 15, further comprising a third lint tape layer comprising a base sheet and an adhesive coating, wherein said base sheet comprises a fibrous web impregnated with a binder composition, wherein said third lint tape layer is arranged such that said adhesive coating of said second lint tape layer contacts said fibrous web of said third lint tape layer.

17. A lint tape product as in claim 10, wherein said base sheet of said first lint tape layer has been creped to define a creped surface and an uncreped surface, and wherein said adhesive coating of said first lint tape layer is applied to said uncreped surface.

18. A lint tape product as in claim 10, wherein said detackifying agent comprises a clay.

19. A lint tape product as in claim 10, wherein said detackifying agent and comprises a kaolin clay.

20. A lint tape product as in claim 10, wherein said latex polymer comprises an acrylic latex.

21. A lint tape as in claim 1, wherein said adhesive coating comprises the pressure-sensitive adhesive and the detackifying agent in a respective weight ratio of from about 2:1 to about 15:1.

22. A lint tape as in claim 1, wherein said adhesive coating comprises the pressure-sensitive adhesive and the detackifying agent in a respective weight ratio of from about 4:1 to about 10:1.

23. A lint tape product as in claim 10, wherein the first lint tape layer consists of the base sheet and the adhesive coating, and wherein the second lint tape layer consists of the base sheet and the adhesive coating.

* * * * *